(12) United States Patent
Eastin

(10) Patent No.: US 7,370,808 B2
(45) Date of Patent: May 13, 2008

(54) METHOD AND SYSTEM FOR MANUFACTURING RADIO FREQUENCY IDENTIFICATION TAG ANTENNAS

(75) Inventor: David Eastin, Rockville, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 169 days.

(21) Appl. No.: 10/998,994

(22) Filed: Nov. 30, 2004

(65) Prior Publication Data

US 2005/0151699 A1 Jul. 14, 2005

Related U.S. Application Data

(60) Provisional application No. 60/535,545, filed on Jan. 12, 2004.

(51) Int. Cl.
*G06K 19/06* (2006.01)

(52) U.S. Cl. ........................................ 235/492; 438/106

(58) Field of Classification Search .................. 40/124, 40/800; 206/486; 235/492, 441, 451; 438/106
See application file for complete search history.

(56) References Cited

U.S. PATENT DOCUMENTS

| | | |
|---|---|---|
| 3,724,737 A | 4/1973 | Bodnar |
| 3,891,157 A | 6/1975 | Justus |
| 3,989,575 A | 11/1976 | Davies et al. |
| 4,346,514 A | 8/1982 | Makizawa et al. |
| 4,480,742 A | 11/1984 | Muylle |
| 4,925,808 A | 5/1990 | Richardson |
| 5,044,707 A * | 9/1991 | Mallik ........................... 359/2 |
| 5,051,279 A * | 9/1991 | Murata et al. ............... 427/150 |
| 5,267,228 A * | 11/1993 | Yashima et al. ............. 369/100 |
| 5,519,381 A | 5/1996 | Marsh et al. |
| 5,528,222 A | 6/1996 | Moskowitz et al. |
| 5,537,105 A | 7/1996 | Marsh et al. |
| 5,557,280 A | 9/1996 | Marsh et al. |
| 5,564,888 A | 10/1996 | Doan |

(Continued)

FOREIGN PATENT DOCUMENTS

DE 196 34 473 C2 1/1998

(Continued)

OTHER PUBLICATIONS

English Language Abstract for DE 19634473, published Jan. 22, 1998, 1 page.

(Continued)

*Primary Examiner*—Uyen-Chau N Le
(74) *Attorney, Agent, or Firm*—Sterne, Kessler, Goldstein & Fox P.L.L.C.

(57) ABSTRACT

A method and system for manufacturing radio frequency identification (RFID) tag antennas is described. A casting surface is provided having at least one raised antenna pattern extending therefrom. The casting surface is coated at least in an area other than the at least one raised antenna pattern with a coating solution. The casting surface is applied to a target sheet thereby depositing the coating solution onto the target sheet. The coating solution is cured to form at least one depression corresponding to the at least one raised antenna pattern. The at least one depression is filled with a conductive material to form at least one antenna on the target sheet.

27 Claims, 8 Drawing Sheets

U.S. PATENT DOCUMENTS

| | | | |
|---|---|---|---|
| 5,566,441 A | 10/1996 | Marsh et al. | |
| 5,585,193 A | 12/1996 | Josephy et al. | |
| 5,837,349 A | 11/1998 | Van Erden et al. | |
| 5,904,546 A | 5/1999 | Wood et al. | |
| 5,946,198 A | 8/1999 | Hoppe et al. | |
| 5,966,903 A | 10/1999 | Dudderar et al. | |
| 5,982,284 A | 11/1999 | Baldwin et al. | |
| 6,018,299 A | 1/2000 | Eberhardt | |
| 6,027,027 A * | 2/2000 | Smithgall | 235/488 |
| 6,082,660 A | 7/2000 | Meyer | |
| 6,087,940 A * | 7/2000 | Caperna et al. | 340/572.5 |
| 6,091,332 A | 7/2000 | Eberhardt et al. | |
| 6,145,901 A | 11/2000 | Rich | |
| 6,147,662 A | 11/2000 | Grabau et al. | |
| 6,165,386 A | 12/2000 | Endo et al. | |
| 6,206,292 B1 | 3/2001 | Robertz et al. | |
| 6,262,692 B1 | 7/2001 | Babb | |
| 6,265,977 B1 | 7/2001 | Vega et al. | |
| 6,281,795 B1 | 8/2001 | Smith et al. | |
| 6,322,903 B1 | 11/2001 | Siniaguine et al. | |
| 6,357,664 B1 * | 3/2002 | Zercher | 235/488 |
| 6,416,608 B1 | 7/2002 | Mynott et al. | |
| 6,451,154 B1 | 9/2002 | Grabau et al. | |
| 6,476,775 B1 * | 11/2002 | Oberle | 343/895 |
| 6,497,371 B2 * | 12/2002 | Kayanakis et al. | 235/492 |
| 6,514,790 B1 | 2/2003 | Plettner et al. | |
| 6,606,247 B2 | 8/2003 | Credelle et al. | |
| 6,608,370 B1 | 8/2003 | Chen et al. | |
| 6,667,092 B1 * | 12/2003 | Brollier et al. | 428/182 |
| 6,731,353 B1 | 5/2004 | Credelle et al. | |
| 6,988,666 B2 * | 1/2006 | Appalucci et al. | 235/488 |
| 7,051,429 B2 * | 5/2006 | Kerr et al. | 29/825 |
| 2002/0129488 A1 * | 9/2002 | Lieberman | 29/600 |
| 2003/0136503 A1 * | 7/2003 | Green et al. | 156/264 |
| 2004/0203185 A1 * | 10/2004 | Kerr et al. | 438/106 |

FOREIGN PATENT DOCUMENTS

| | | |
|---|---|---|
| DE | 198 05 031 C2 | 8/1999 |
| DE | 198 40 226 A1 | 3/2000 |
| FR | 2 775 533 | 9/1999 |
| WO | WO 00/14733 A1 | 3/2000 |
| WO | WO 01/54058 A1 | 7/2001 |
| WO | WO 01/61646 A1 | 8/2001 |
| WO | WO 01/95241 A1 | 12/2001 |
| WO | WO 02/37414 A1 | 5/2002 |
| WO | WO 02/49093 A1 | 6/2002 |
| WO | WO 02/082368 A1 | 10/2002 |

OTHER PUBLICATIONS

English Language Abstract for DE 19805031, published Aug. 19, 1999, 1 page.

English Language Abstract for DE 19840226, published Mar. 16, 2000, 1 page.

English Language Abstract for FR 2775533, published Sep. 3, 1999, 1 page.

Sarma, Sanjay, "White Paper-Towards the 5¢ Tag", Auto-ID Center, Published Nov. 1, 2001, pp. 1-19.

International Search Report for International Application No. PCT/US05/00879, Int'l Filing Date: Jan. 12, 2005, 4 pages, mailing date: Aug. 28, 2006.

* cited by examiner

METHOD AND SYSTEM FOR MANUFACTURING RADIO FREQUENCY IDENTIFICATION TAG ANTENNAS

CROSS REFERENCE TO RELATED APPLICATIONS

This application claims the benefit of U.S. Provisional Application No. 60/535,545, filed Jan. 12, 2004, which is incorporated herein by reference in its entirety.

BACKGROUND OF THE INVENTION

1. Field of the Invention

The present invention relates to radio frequency identification technology, and more specifically to radio frequency identification tag antennas.

2. Background Art

Currently, radio frequency identification (RFID) tag antennas are manufactured using the following techniques: (1) subtractive etching processes; (2) additive electroplating processes; and (3) silk screen printing processes. Subtractive etching processes typically start with a metal plane attached to a substrate. An antenna design is printed on the metal plane with a photo resist material. Portions of the metal plane not covered with photoresist material are etched away using a caustic bath to leave a final antenna pattern on the substrate. In a typical electroplating process, a light coating of silver, or other metal, is printed on a substrate to form an antenna design. Copper, aluminum, or other metal, is electroplated onto the silver, to form the final antenna pattern. In a silk screen printing process, silver ink is screen printed on a substrate in the form of an antenna design, and the ink is dried to end up with the final antenna pattern.

All three processes are costly, do not achieve desired resolution, have inherent process variability, and in the case of silk screen printing, lack the capability to deliver the desired caliper (i.e., metal thickness). Furthermore, all three processes are environmentally unfriendly.

Thus, what is needed is a method and system for manufacturing RFID antennas that provides the necessary resolution, has acceptable process variability, delivers the desired caliper, and is environmentally friendly.

BRIEF SUMMARY OF THE INVENTION

A method and system for manufacturing radio frequency identification (RFID) tag antennas is described. The method and system for manufacturing RFID tag antennas in accordance with the present invention relates to using a casting element to form antennas on a substrate.

An embodiment of the present invention provides a system for manufacturing RFID tag antennas, including a casting surface, a coating solution, a curing agent, and an antenna material applicator. The casting surface includes at least one antenna pattern extending therefrom. The coating solution applicator coats the casting surface at least in an area other than the at least one antenna pattern with a coating solution. The coating solution is then deposited onto a target sheet. The curing agent cures the coating solution on the target sheet to form at least one depression corresponding to the at least one antenna pattern. The antenna material applicator fills the at least one depression with a conductive material to form at least one antenna on the target sheet.

Another embodiment of the present invention provides a method for manufacturing RFID tag antennas. A casting surface is provided having at least one raised antenna pattern extending therefrom. The casting surface is coated at least in an area other than the at least one raised antenna pattern with a coating solution. The casting surface is applied to a target sheet thereby depositing the coating solution onto the target sheet. The coating solution is cured to form at least one depression corresponding to the at least one raised antenna pattern. The at least one depression is filled with a conductive material to form at least one antenna on the target sheet.

A further embodiment of the present invention provides a system for manufacturing RFID tag antennas, including a casting element and a curing agent. The casting element has a surface that receives a conductive material. The casting element is applied to a target sheet to dispose the conductive material thereon, thereby forming at least one antenna on the target sheet. The curing agent cures the at least one antenna formed on the target sheet.

A still further embodiment of the present invention provides a method for manufacturing radio frequency identification (RFID) tag antennas. A casting element having a surface that receives a conductive material is provided. The casting element is applied to a target sheet to dispose the conductive material thereon, thereby forming at least one antenna on the target sheet. The at least one antenna formed on the target sheet is cured.

These and other advantages and features will become readily apparent in view of the following detailed description of the invention.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 6:
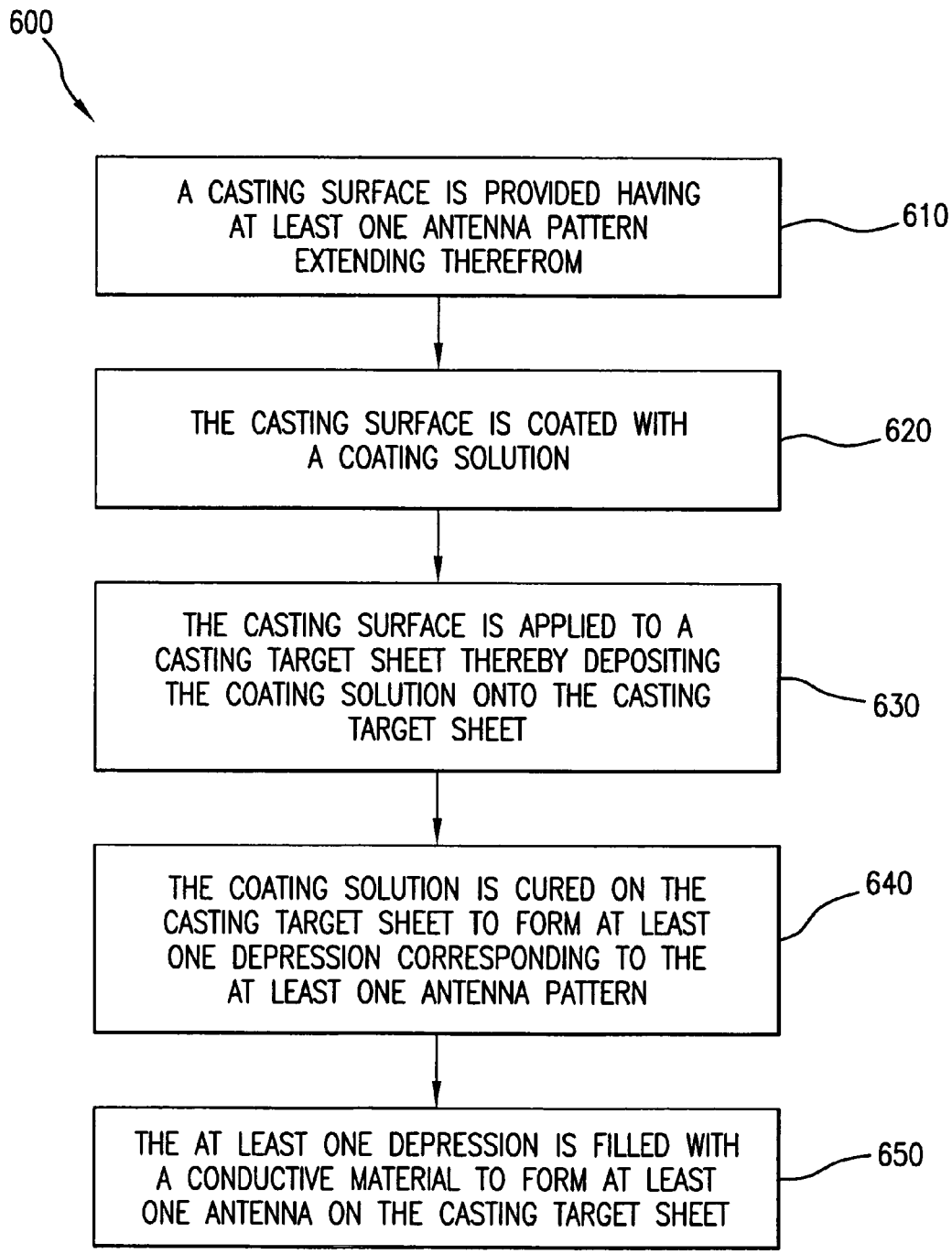

FIG. 6 provides exemplary steps for manufacturing RFID tag antennas, according to an embodiment of the present invention.

Figure 7:
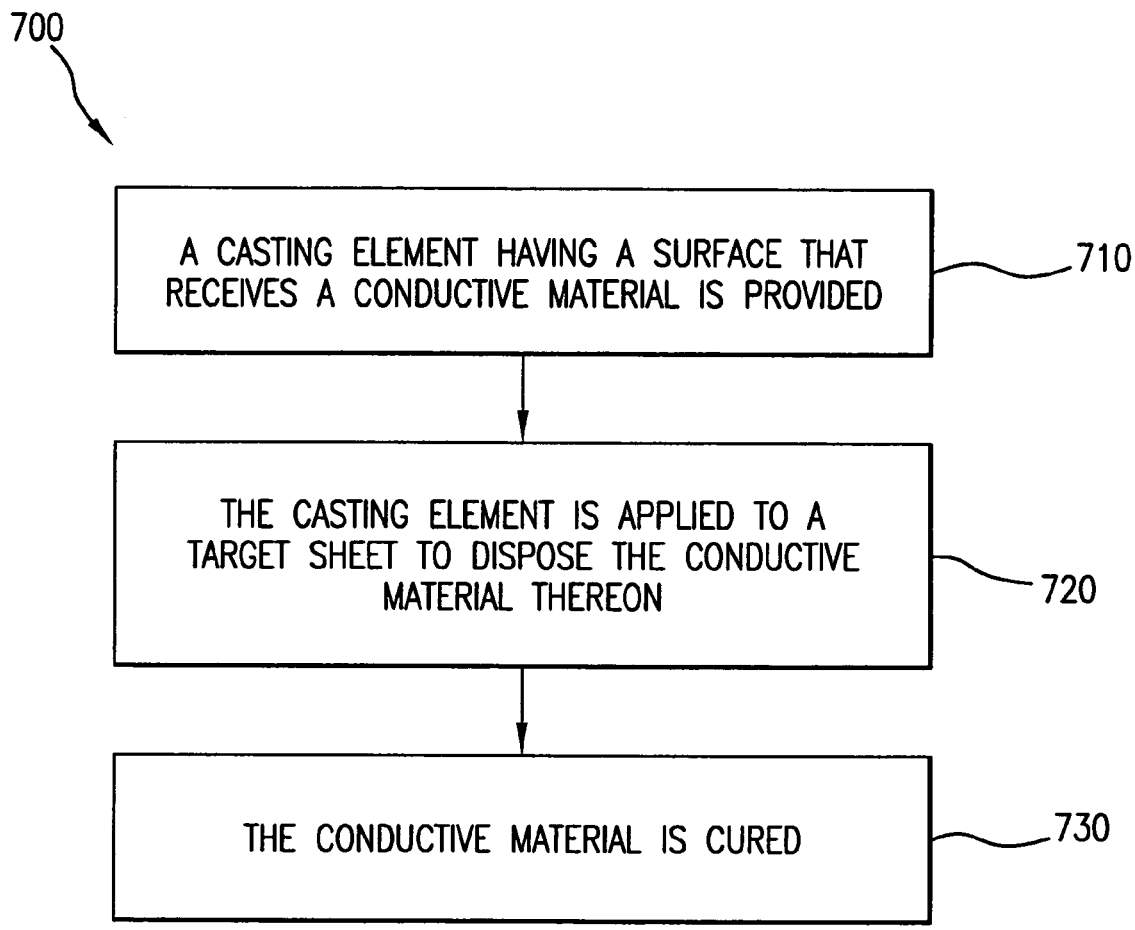

FIG. 7 provides exemplary steps for manufacturing RFID tag antennas, according to an alternative embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention relates to the manufacture or fabrication of radio frequency identification (RFID) antennas. The RFID antennas produced by embodiments of the present invention have high resolution, high metallic content, and are low cost, being formed in large volumes on paper and film substrates.

The detailed description of the invention is divided into four sections. Section I discusses an exemplary system for manufacturing RFID tag antennas, in accordance with an embodiment of the present invention. Section II discusses example alternative embodiments of a system for manufacturing RFID tag antennas. Section III discusses example processes for manufacturing RFID tag antennas, in accordance with embodiments of the present invention. Section IV discusses example advantages.

I. An Exemplary System for Manufacturing RFID Tag Antennas

Figure 1:
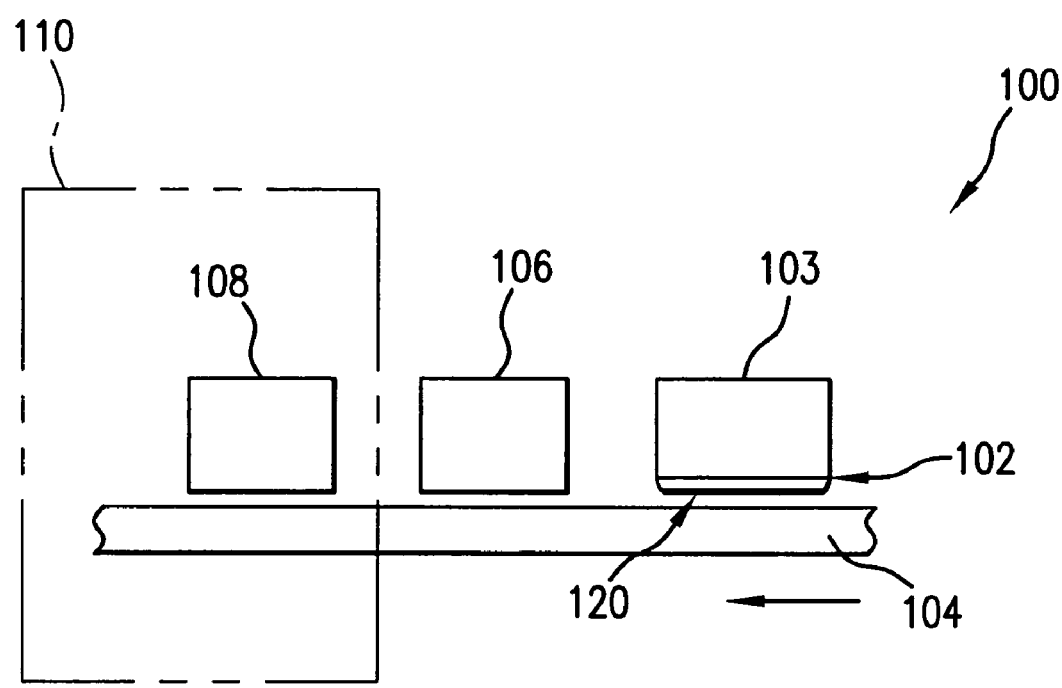
FIG. 1 shows an example system for manufacturing RFID tag antennas, according to an embodiment of the present invention.

FIG. 1 shows a system 100 for manufacturing RFID tag antennas, according to an embodiment of the present invention. System 100 includes a casting element 103 having casting surface 102, a curing agent 106, and an antenna material applicator 108. In addition, FIG. 1 also includes target sheet 104, which is not necessarily included in system 100.

Casting surface 102 of casting element 103 is provided having one or more antenna patterns extending therefrom. Casting surface 102 is etched or "embossed" to form the one or more antenna patterns thereon. For example, casting surface 102 may be etched with a laser to form the one or more antenna designs. Casting surface 102 is etched in areas other than the actual antenna pattern(s) to form the one or more raised antenna patterns. The antenna patterns may extend from the casting surface by any distance, including in the range of 0.5 millimeters to 1 millimeters, and greater and lesser distances. The casting element, and casting surface, can be any size, depending on the size and number of antenna patterns to be formed thereon.

Figure 2A:
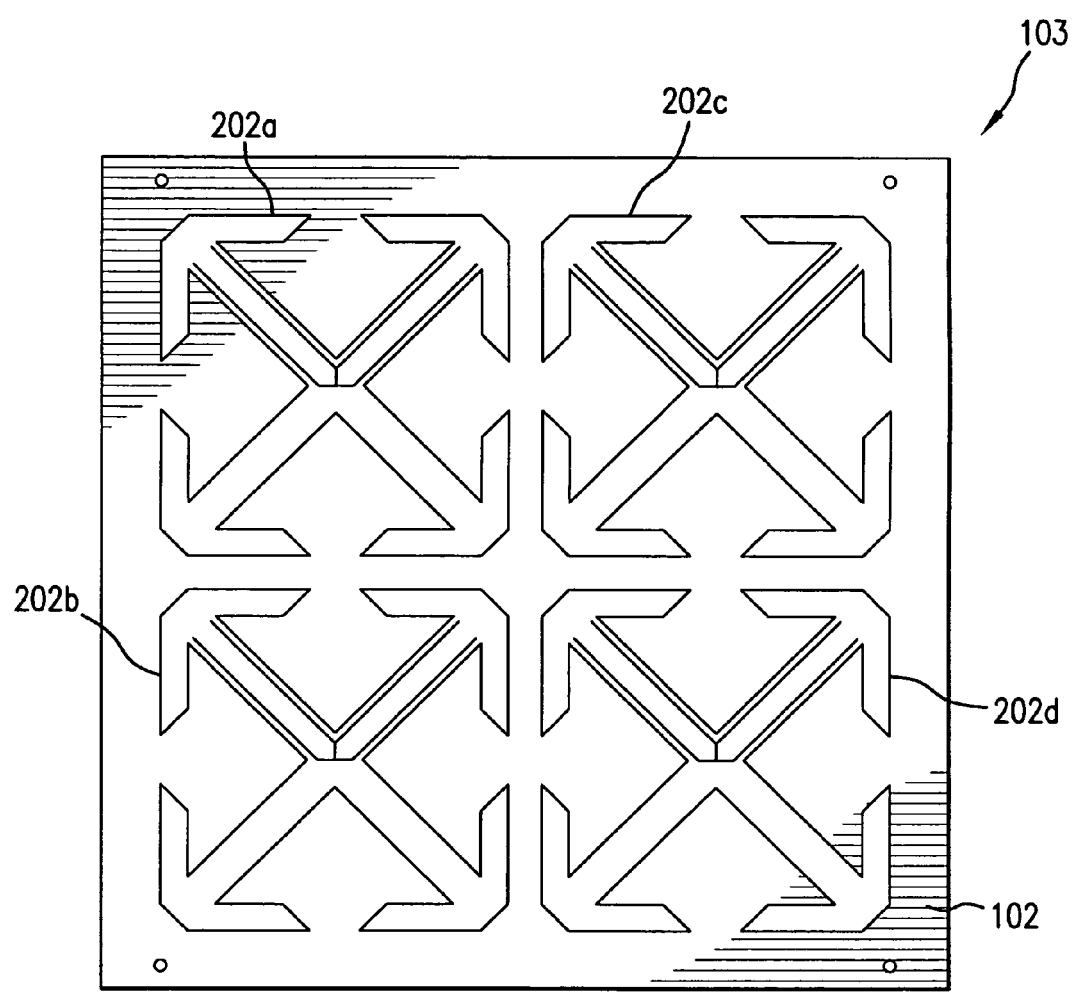
FIGS. 2A-2D show an example embossure plate casting element with a plurality of raised antenna designs or patterns, according to an embodiment of the present invention.
Figure 2B:
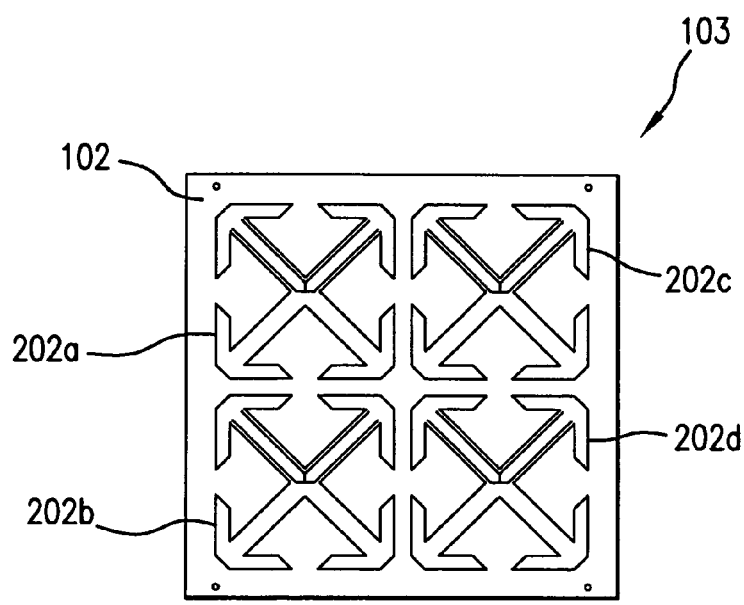
Figure 2C:
Figure 2D:
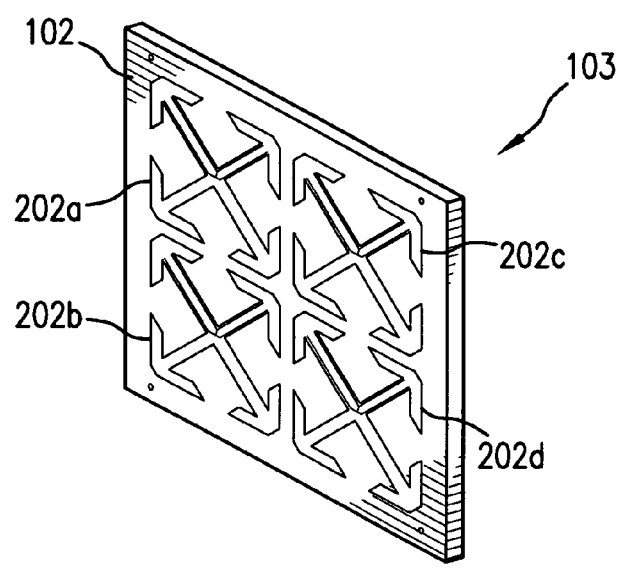
Figure 2E:
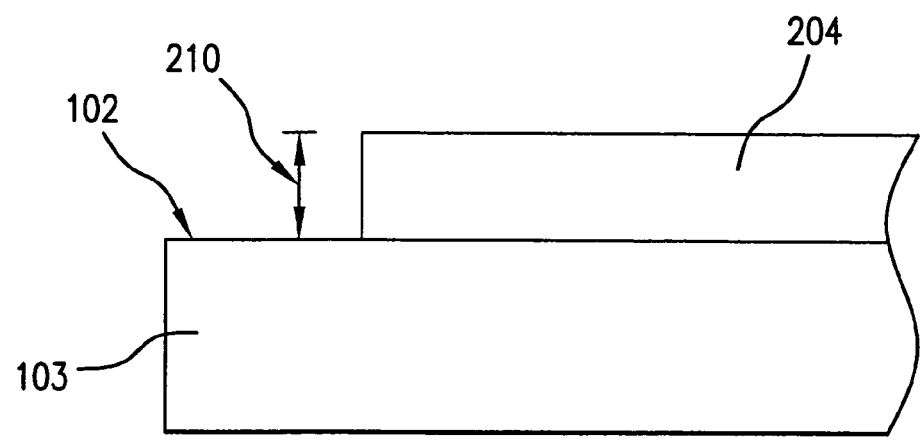
FIG. 2E shows a cross-sectional view of the casting element of FIGS. 2A-2D having a raised antenna pattern, according to an example embodiment of the present invention.

For example, FIGS. 2A-2E show views of casting element 103, according to an example embodiment of the present invention. Casting surface 102 of casting element 103 includes four antenna patterns 204a-204d. Antenna patterns 204a-204d are raised portions on casting surface 102. FIG. 2E shows a side view of casting element 103 having a raised antenna pattern 204. Raised antenna pattern 204 has a height 210 above casting surface 102. As mentioned above, height 210 can be in the range of 0.5 millimeters to 1 millimeters, for example, and can have greater and lesser distances.

FIGS. 2A-2E show casting element 103 as being planar in shape. However, casting element 103 can have other shapes. For example, casting element 103 can be cylindrical in shape. This alternative embodiment is described in more detail below with reference to FIG. 4.

FIG. 2A shows casting element 103 with four antenna patterns 204a-d formed thereon. The specific number of antenna patterns is shown for exemplary purposes only, and not limitation. Note that in embodiments, any number of antenna patterns can be formed on a casting element. For example, a cylindrical casting element 60 inches wide could have thirty 2-inch antennas formed across its width, and any number of antennas formed around its circumference, depending on its diameter.

A coating solution applicator (not specifically shown) coats casting surface 102 at least in an area other than antenna patterns 204a-d with a coating solution 120. The coating solution applicator can spray, pour, or otherwise apply the coating solution onto target sheet 104. For example, casting surface 102 can be dipped into the coating solution applicator. Coating solution 120 can be a polymer, an acrylic, a urethane, or other material. As described below, in embodiments, coating solution 120 is electron beam ("e-beam") curable, thermally curable, or otherwise curable.

Casting surface 102 is applied to target sheet 104 to deposit the coating solution onto target sheet 104. In other words the coating solution is "cast" onto target sheet 104. Target sheet 104 can be a sheet of polyester, paper, or other substrate type, for example. Target sheet 104 can be any size. For example, the target sheet can be sized to receive a single antenna pattern, or any number of antenna patterns. For example, a 60 inch wide casting element can be used to form antenna patterns on a 60 inch wide target sheet. Target sheet 104 can be a single rectangular sheet, or in the form of a roll of any length, to form a continuous roll of antennas. For example a 10,000 feet long roll target sheet can have a very large number of antennas formed thereon.

Curing agent 106 cures coating solution 120 on target sheet 104 to form at least one depression corresponding to the one or more antenna patterns. In other words, coating solution 120, after being cured, has one or more antenna-shaped depressions formed within due to the raised antenna patterns of casting surface 102. The depressions can also be referred to as "embossures." In an embodiment, coating solution 120 may be e-beam curable. Thus, curing agent 106 may include the use of an e-beam to cure coating solution 120.

Figure 3:
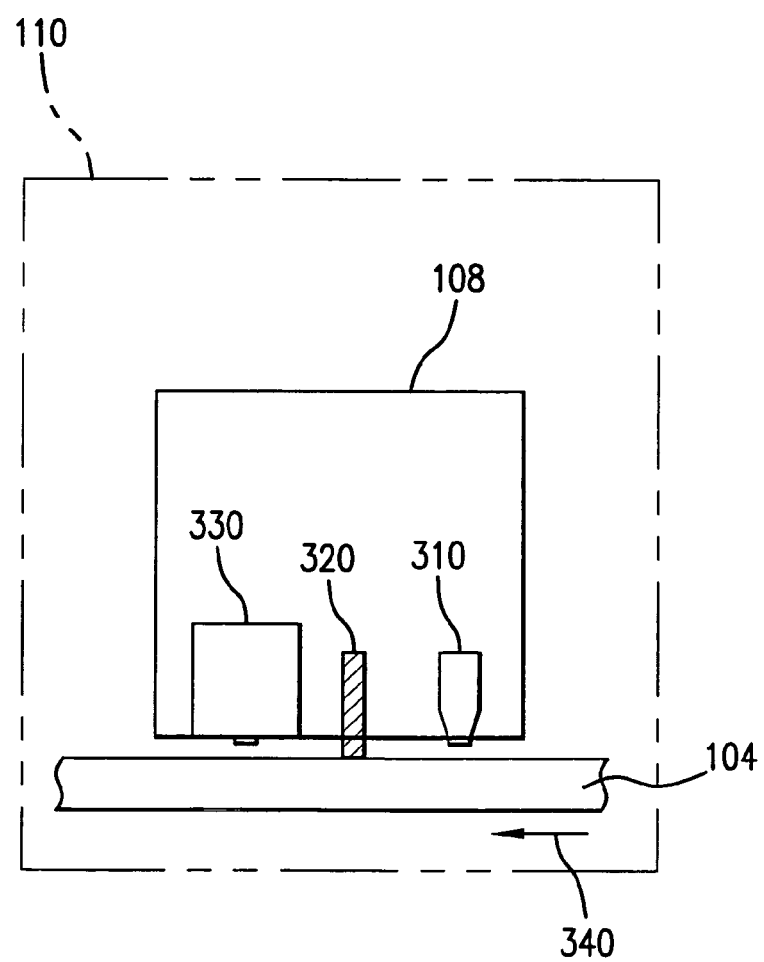
FIG. 3 shows an example antenna material applicator, according to an embodiment of the present invention.

Antenna material applicator 108 fills the at least one depression with a conductive material to form at least one antenna on target sheet 104. For example, FIG. 3 shows an embodiment of antenna material applicator 108. In this example embodiment, antenna material applicator 108 includes an ink depositor 310, a squeegee 320, and an ink curing agent 330. Ink depositor 310 coats target sheet 104 with a conductive ink, such as a silver ink. Squeegee 320 squeegees target sheet 104, also referred to as "spanishing," to concentrate the conductive ink in the at least one depression. For example, target sheet 104 can be placed in a knife over roll coater to perform the squeegeing. Ink curing agent 330 then cures the conductive ink in the at least one depression. The ink can be thermally cured or high-energy radiation cured, for example.

Thus, in the embodiment of FIG. 3, target sheet 104 may move with respect to antenna material applicator 108 in the direction of arrow 340 shown in FIG. 3, while ink depositor 310, squeegee 320, and ink curing agent 330 perform their functions.

In another embodiment, antenna material applicator 108 fills the at least one depression with a metallic powder. The metal powder can then be fused in the at least one depression.

II. Alternative Embodiments of the System for Manufacturing RFID Tag Antennas As described above, FIG. 1 shows an exemplary system embodiment for manufacturing RFID tag antennas. Variations of the above-described exemplary system are described below.

Figure 4:
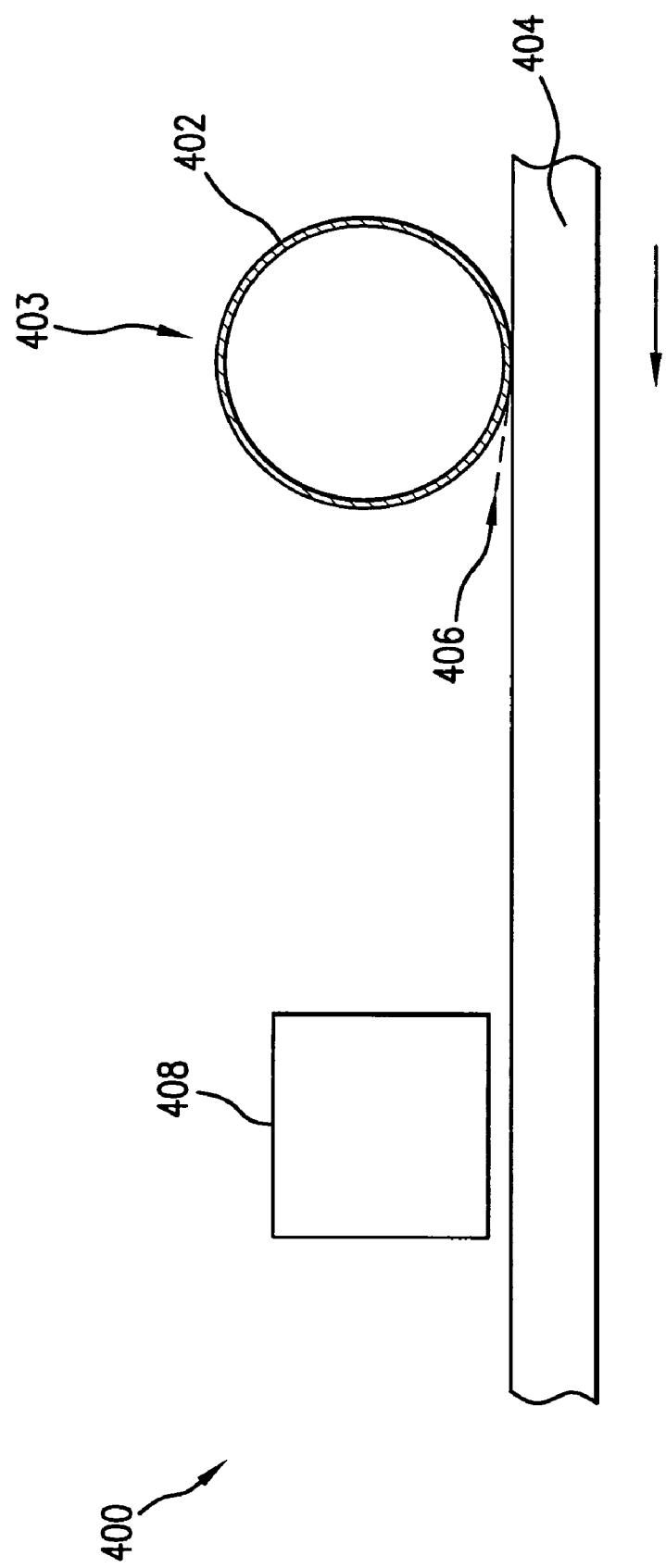
FIG. 4 shows an example system for manufacturing RFID tag antennas, according to an embodiment of the present invention.

FIG. 4 shows a system 400 for manufacturing RFID tag antennas, according to an alternative embodiment of the present invention. System 400 includes a casting element 403 having casting surface 402, a curing agent 406, and an antenna material applicator 408. In addition, FIG. 4 includes target sheet 404, which is not necessarily included in system 400.

As seen in FIG. 4, casting element 403 is a cylindrical casting element, such as a Gravure cylinder. Casting surface 402 of casting element 403 is rolled against target sheet 404 to deposit the coating solution thereon.

In the example of FIG. 4, curing agent 406 is applied to target surface 404 at the same point where casting surface 402 deposits the coating solution. That is, the casting and curing processes occur simultaneously. In contrast, FIG. 1 shows curing agent 106 curing the coating solution after it is applied to target sheet 104 by casting surface 102.

It should be noted that FIG. 4 shows curing agent 406 and casting surface 402 being applied to target sheet 404 simultaneously for exemplary purposes only, and not limitation. It should be appreciated that curing agent 406 can be applied after the coating solution is applied to target sheet 404, in like manner to that shown in FIG. 1. In addition, with respect to system 100 shown in FIG. 1, it should be appreciated that the curing and coating processes can occur simultaneously. That is, the curing and coating processes can occur simultaneously in embodiments in which the casting element is a plate.

Note further that curing agent 406 can be applied from either the top side of target sheet 404 (as shown in FIGS. 1 and 4) or from the bottom side of target sheet 404, depending on the particular coating solution.

Figure 5:
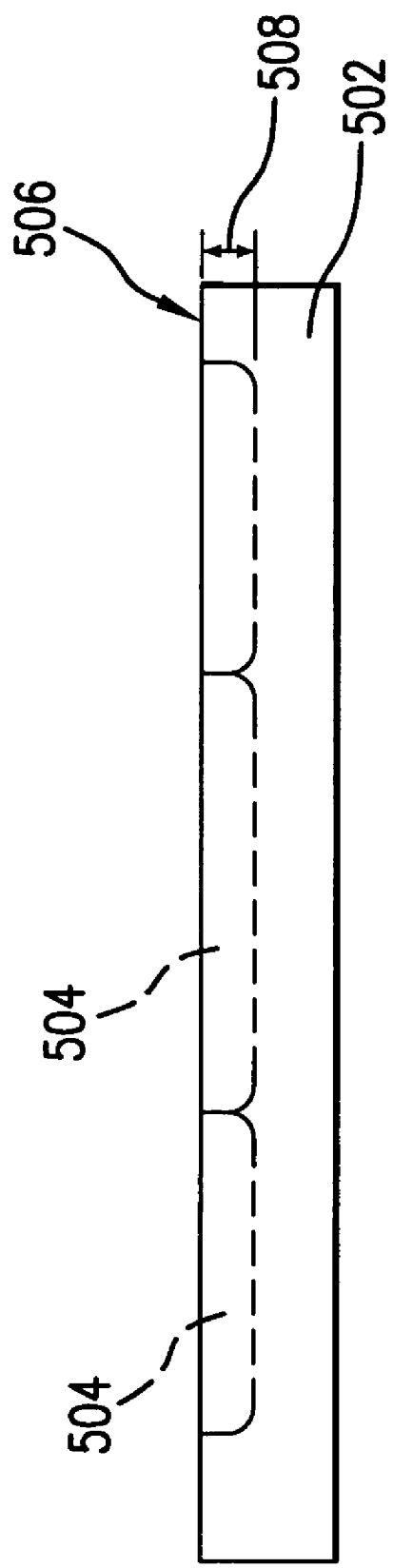
FIG. 5 shows an example casting element with a plurality of antenna-shaped depressions formed therein, according to an embodiment of the present invention.

FIG. 5 shows a casting element 502, according to another embodiment of the present invention. In this embodiment, casting element 502 has a casting surface 506 with one or more antenna-shaped depressions 504 formed therein. As shown in FIG. 5, depressions 504 have a depth 508, which may be the same distance as height 210 of raised antenna patterns 204 shown in FIG. 2E, or may be a different distance. Antenna-shaped depressions 504 are filled with a conductive ink or metallic pattern, and then cast onto the target sheet, to leave the conductive ink or metal pattern on the target sheet that can then be cured to form one or more antennas. The conductive ink can be thermally cured or high-energy radiation cured, for example.

In another embodiment, a casting element having raised antenna pattern(s), such as casting element 103 or 403, can have a thin sheet of conductive material (e.g., a metal foil, such as copper or aluminum) applied to it. The casting element can then be applied to the target sheet, which already has the antenna-shaped depressions formed in it. The raised antenna pattern(s) of the casting element push respective areas of the thin sheet of conductive material into the depressions of the target sheet. Edges of the raised antenna pattern(s) of the casting element cut the thin sheet of conductive material during this procedure, to leave antenna-shaped areas of the thin sheet of conductive material in the depressions, to form the antennas.

Note that in an embodiment, the target sheet can have a row of holes formed along one or both edges, for registration purposes. The casting element can be used to form these holes. The casting element may have tabs extending from the casting surface to form the holes in the target sheet. For example, the tabs can be formed during laser etching of the casting surface. For a cylindrical casting element, the tabs can be formed along the edges of the cylinder, so that the cylinder can roll along the target sheet to create depressions with the tabs where the holes are to be formed. After the hole-depressions are formed in the target sheet by the casting surface, a laser or other device can be used to extend the hole-depressions entirely through the target sheet. Furthermore, in later stages of tag fabrication, such as attachment of dies to the antennas, the holes in the target sheet can be used for precise registration to the antennas formed thereon.

III. Exemplary Methods for Manufacturing RFID Tag Antennas

FIG. 6 illustrates a flowchart 600 of a method for manufacturing RFID tag antennas, in accordance with an embodiment of the present invention. The method of flowchart 600 begins at step 610, in which a casting surface is provided having at least one antenna pattern extending therefrom. For example, the casting surface can be casting surface 102 (FIG. 1), which has a raised antenna pattern 104 extending therefrom. The casting surface can be the surface of a plate (e.g., casting element 103 (FIG. 1)) or a cylinder (e.g., casting element 403 (FIG. 4)).

In step 620, the casting surface is coated with a coating solution. For example, the coating solution can be coating solution 120 (FIG. 1).

In step 630, the casting surface is applied to a target sheet, thereby depositing the coating solution onto the target sheet. The target sheet can be, for example, target sheet 104. The application of the casting surface on the target sheet is dependent on the particular type of casting element. For example, when the casting element is a plate, the casting solution is cast on the target sheet, in like manner to that described with reference to FIG. 1. In another example, when the casting element is a cylinder, the casting surface is rolled against the target sheet, in like manner to that described with reference to FIG. 4.

In step 640, the coating solution is cured on the target sheet to form at least one depression corresponding to the at least one antenna pattern. For example, the coating solution can be cured by curing agent 106 (FIG. 1) or curing agent 406 (FIG. 4). That is, curing of the coating solution can occur after the coating solution is cast (like curing agent 106) or the curing and casting can occur simultaneously (like curing agent 406).

In step 650, the at least one depression is filled with a conductive material to form at least one antenna on the target sheet. For example, antenna material applicator 108 or 408 could fill the at least one depression with the conductive material.

FIG. 7 illustrates a flowchart 700 of another method of manufacturing RFID tag antennas, in accordance with an embodiment of the present invention. Flowchart 700 begins at step 710, in which a casting element having a surface that receives a conductive material is provided. For example, the surface may be casting surface 102 of casting element 103 (FIG. 1) or casting surface 402 of casting element 403 (FIG. 4); i.e., the casting element may be a plate, a cylinder, or some other shape. In addition, the casting surface may have antenna-shaped depressions (e.g. depressions 504 (FIG. 5)) or a raised antenna-shaped pattern (e.g., antenna pattern 204*a-d* (FIG. 2)). If the surface has antenna-shaped depressions, the depressions are filled with a conductive material. If the surface has a raised antenna-shaped pattern, a sheet of conductive material (e.g. metal foil) is applied to the surface of the casting element.

In step 720, the casting element is applied to a target sheet to dispose the conductive material thereon. For casting element 502 of FIG. 5, the conductive material that fills antenna-shaped depressions 504 is deposited on the target sheet (e.g., target sheet 104). For casting element 103 of FIG. 2, edges of the raised antenna-shaped pattern cut the metal foil, thereby depositing the metal foil on the target sheet.

In step 730, the conductive material on the target sheet is cured. For example, the conductive material can be thermally cured or high-energy radiation cured, as mentioned above, to form one or more antenna patterns on the target surface.

IV. Example Advantages

These embodiments of the present invention fabricate or manufacture antennas by embossing an extremely accurate and reproducible image of the antenna. In an example embodiment, an "ultracast" process similar to that developed by SAPPI-NA (South Africa Paper and Pulp Institute-North America) may be used, whereby an antenna image is embossed using the "ultracast" process onto a special polymer coating on polyester or paper target sheet. Once embossed, the image is cured by an electron beam system. The casting is done in wide web (60 inch) format and wound in 10,000 feet long rolls. The cast antenna embossures are extremely accurate and consistent. Furthermore, the process is non-polluting. Once cast, the rolls are converted to the width required for input to a tag assembly machine, which may apply integrated circuit dies and/or otherwise process the antennas. The slit rolls can be processed in several iterations to manufacture the RFID antennas.

By embossing the antenna designs using the above-described casting process, large volumes of antenna forms can be created in a wide-web format. The antennas can be made with a greater amount of metal (e.g., silver) than in a screen-printing process. They can also be made at a lower caliper and perform better due to the formation of a solid metallic foil.

Thus, antenna manufacture according to the embodiments described above may have one or more of the following advantages:

A. Higher resolution antennas are formed, for improved performance.
B. Higher reproducibility is realized, for greater consistency in antenna formation.
C. Higher speed antenna printing is possible, for scalability and improved cost.
D. Higher performance is realized, due to improved metal formation.
E. Lower cost are realized, due to reduced raw materials, higher manufacturing speeds, and less waste.
F. Manufacturing is more environmentally safe due to less waste. For example, caustic baths resulting from previous antenna manufacturing techniques are not produced, and therefore disposal thereof is not required.

V. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for manufacturing radio frequency identification (RFID) tag antennas, comprising:
    means for coating a casting surface with a coating solution, the casting surface having at least one raised antenna pattern, wherein the coating solution is electron beam curable;
    means for applying the casting surface to a target sheet thereby depositing the coating solution onto the target sheet, wherein the coating solution is not substantially deposited on the target sheet in areas corresponding to the at least one raised antenna pattern;
    means for curing the coating solution on the target sheet to form at least one depression corresponding to the at least one raised antenna pattern, wherein the means for curing comprises an electron beam that cures the coating solution; and
    means for filling the at least one depression with a conductive material to form at least one antenna on the target sheet.

2. The system of claim 1, wherein the casting surface is a surface of a cylinder that rolls against the target sheet to deposit the coating solution onto the target sheet.

3. The system of claim 1, wherein the casting surface is a surface of a plate that is applied to the target sheet to deposit the coating solution onto the target sheet.

4. The system of claim 1, wherein the coating solution is cured while on the casting surface.

5. The system of claim 1, wherein the coating solution is cured while the coating solution is being deposited by the casting surface.

6. The system of claim 1, wherein the coating solution is cured after the casting surface deposits the coating solution.

7. The system of claim 1, wherein the coating solution comprises a polymer.

8. The system of claim 1, wherein the coating solution comprises an acrylic.

9. The system of claim 1, wherein the coating solution comprises a urethane.

10. The system of claim 1, wherein the target sheet comprises polyester.

11. The system of claim 1, wherein the target sheet comprises paper.

12. The system of claim 1, wherein the means for filling comprises:
    an ink depositor that coats the target sheet with a conductive ink;
    a squeegee that squeegees the target sheet to concentrate the conductive ink in the at least one depression; and
    an ink curing agent that cures the conductive ink in the at least one depression.

13. The system of claim 12, wherein the conductive ink is thermally cured by the ink curing agent.

14. The system of claim 12, wherein the conductive ink is high-energy radiation cured by the ink curing agent.

15. The system of claim 1, wherein the means for filling comprises:
    a metallic powder that fills the at least one depression.

16. A method of manufacturing radio frequency identification (RFID) tag antennas, comprising:
    (a) coating a casting surface with a coating solution, the casting surface having at least one raised antenna pattern, wherein the coating solution is electron beam curable;
    (b) applying the casting surface to a target sheet thereby depositing the coating solution onto the target sheet, wherein the coating solution is not substantially deposited on the target sheet in areas corresponding to the at least one raised antenna pattern;

(c) curing the coating solution on the target sheet with an electron beam to form at least one depression corresponding to the at least one raised antenna pattern; and (d) filling the at least one depression with a conductive material to form at least one antenna on the target sheet.

17. The method of claim 16, wherein the casting surface is a surface of a cylinder, wherein step (b) comprises:

(1) moving the target sheet in a first direction; and (2) rotating the cylinder against the moving target sheet to deposit the coating solution onto the target sheet.

18. The method of claim 16, wherein the casting surface is a surface of a plate, wherein step (b) comprises:

applying the plate to the target sheet to deposit the coating solution onto the target sheet.

19. The method of claim 16, wherein step (c) comprises curing the coating solution while it is on the casting surface.

20. The method of claim 16, wherein step (c) is performed during step (b).

21. The method of claim 16, wherein step (a) comprises coating the casting surface with a polymer.

22. The method of claim 16, wherein step (a) comprises coating the casting surface with an acrylic.

23. The method of claim 16, wherein step (a) comprises coating the casting surface with a urethane.

24. The method of claim 16, wherein step (d) comprises:

coating the target sheet with a conductive ink;

squeegeing the target sheet to concentrate the conductive ink in the at least one depression; and curing the conductive ink in the at least one depression.

25. The method of claim 24, wherein curing the conductive ink in the at least one depression comprises thermally curing the conductive ink.

26. The method of claim 24, wherein curing the conductive ink in the at least one depression comprises applying high-energy radiation to cure the conductive ink.

27. The method of claim 16, wherein step (d) comprises:

filling the at least one depression with a metallic powder; and fusing the metal powder in the at least one depression.

* * * * *